March 18, 1952 W. H. BRADLEY 2,589,665
LATCH TYPE CLUTCH MECHANISM
Original Filed June 16, 1944 3 Sheets-Sheet 1

INVENTOR.
William H. Bradley,
BY
Davis, Lindsey, Hibben + Noyes
Attys.

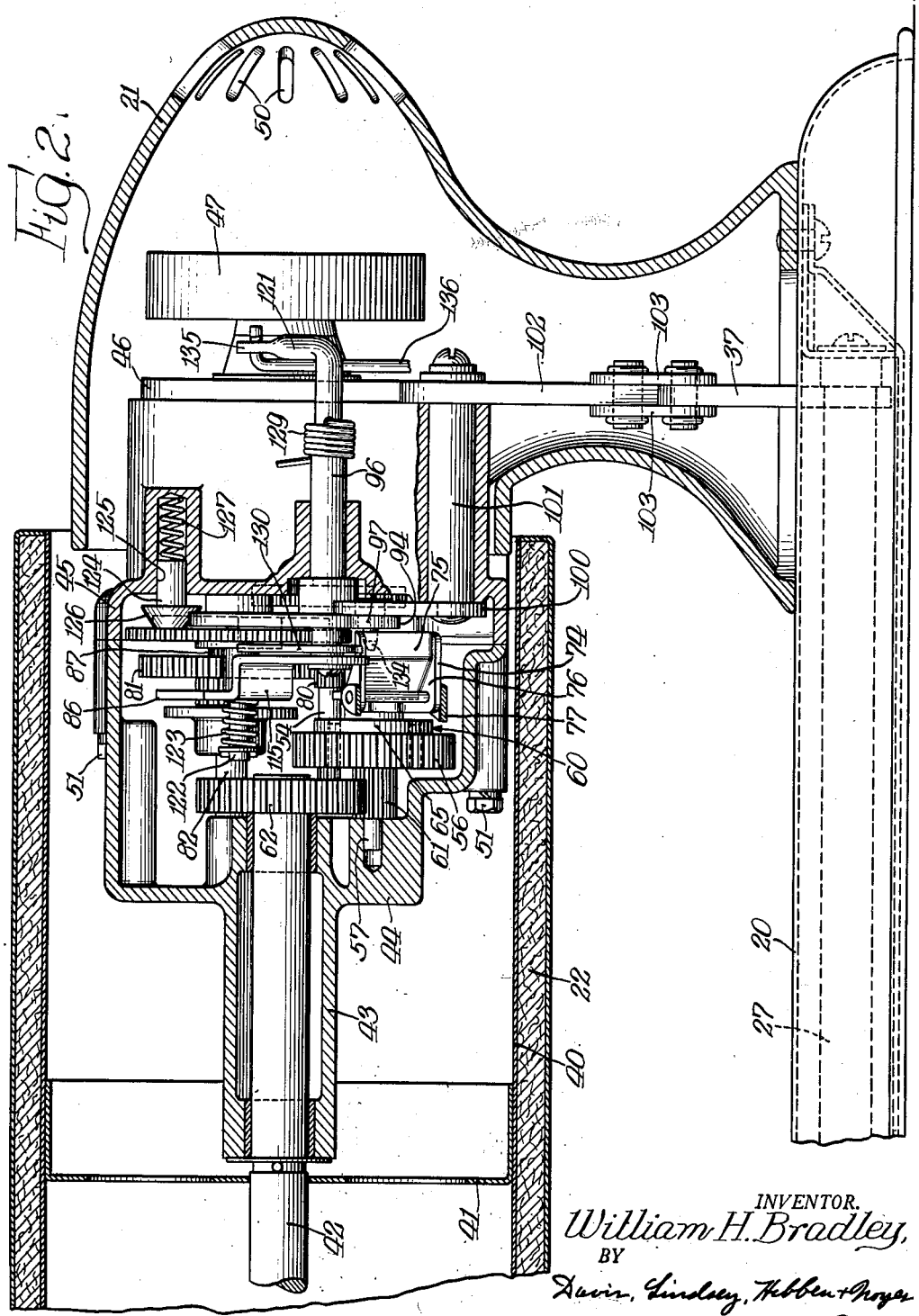

March 18, 1952   W. H. BRADLEY   2,589,665
LATCH TYPE CLUTCH MECHANISM
Original Filed June 16, 1944   3 Sheets-Sheet 3
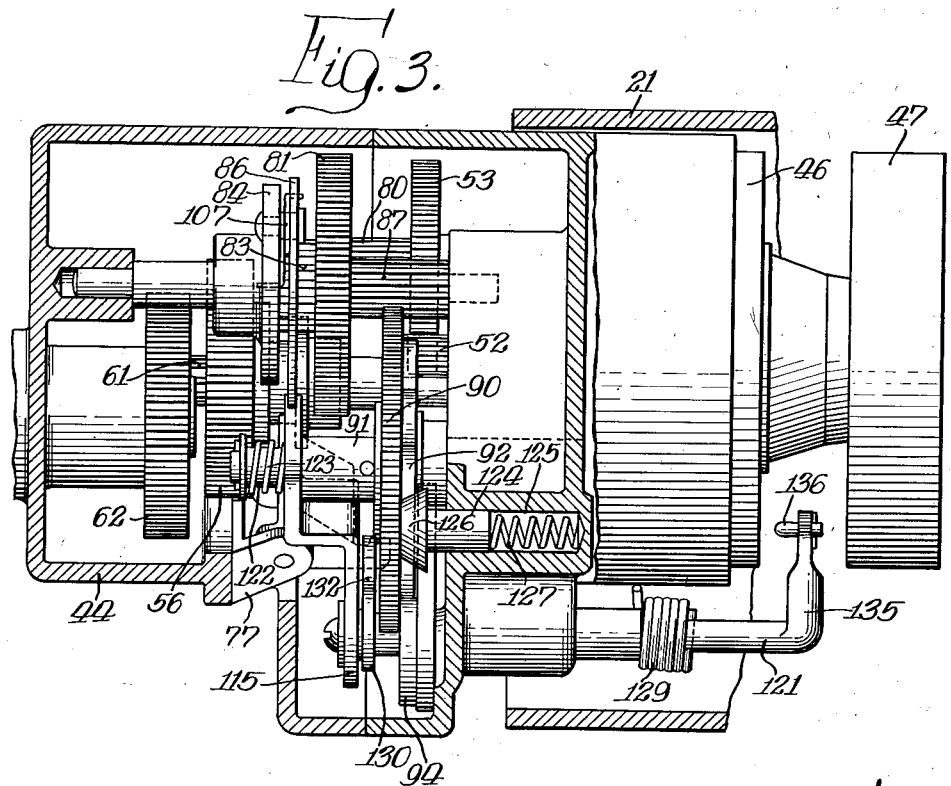
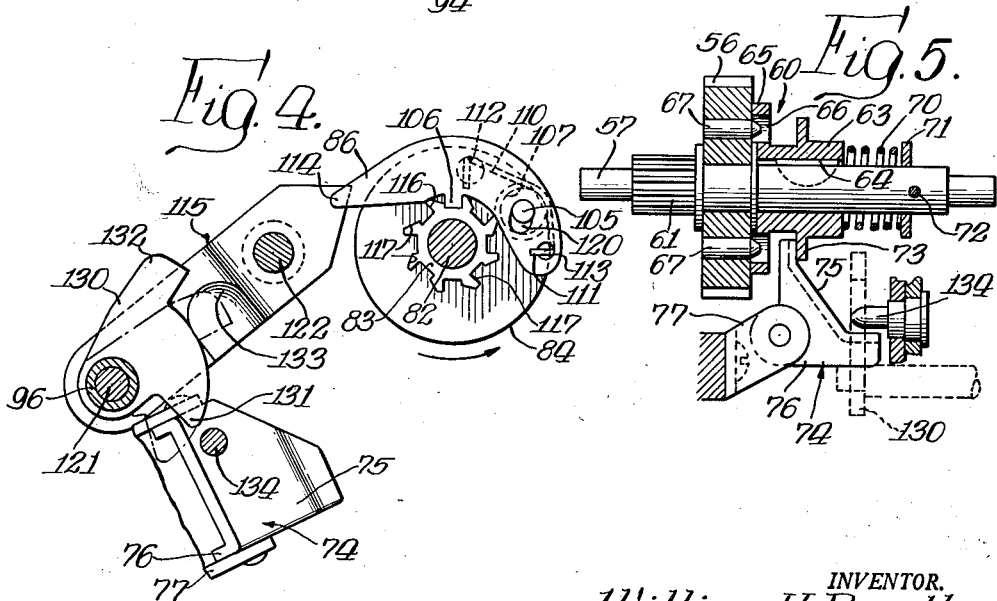
INVENTOR.
William H. Bradley,
BY
Davis, Lindsey, Hibben + Noyes
Attys.

Patented Mar. 18, 1952

2,589,665

UNITED STATES PATENT OFFICE 2,589,665

LATCH TYPE CLUTCH MECHANISM

William H. Bradley, Fort Wayne, Ind., assignor to Horton Manufacturing Company, Fort Wayne, Ind., a corporation of Indiana Original application June 16, 1944, Serial No. 540,672. Divided and this application May 22, 1948, Serial No. 28,711

4 Claims. (Cl. 192—28)

The invention relates generally to ironing machines and more particularly to an ironing machine having a pair of coacting ironing elements, one of which is a roll.

An object of the invention is to provide an ironing machine comprising a pair of relatively shiftable elements, and power operated mechanism for effecting the shifting movement, including a novel clutch comprising engageable members which separate a sufficient distance when disengaged to avoid all chance of clicking against each other.

A still further object is to provide an ironing machine comprising a pair of relatively shiftable elements and power actuated means for effecting the shifting movement including a clutch so situated in said means that it requires one revolution to effect movement of the elements toward each other or from each other, thus necessitating but a single disengaging device, thereby simplifying the structure.

Other objects and advantages will become apparent from the following description taken in connection with the accompanying drawings, in which:

Fig. 2 is a vertical sectional view taken longitudinally of the machine.

Fig. 3 is a horizontal sectional view of the operating mechanism.

Fig. 4 is a detail of the mechanism for shifting one of the ironing elements toward and from the other.

Fig. 5 is a detail of the roll driving mechanism.

Figure 1:
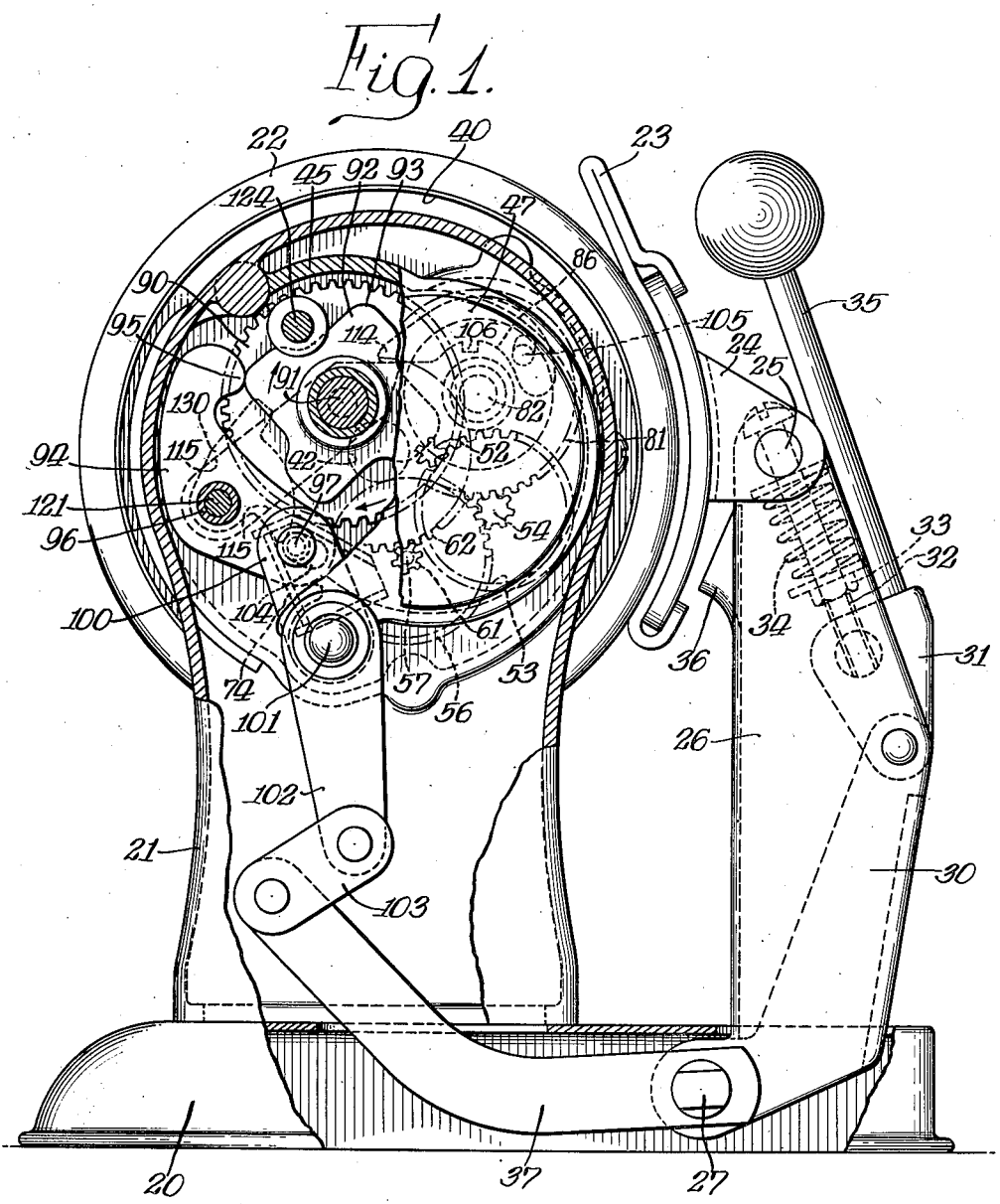
Fig. 1 is an end elevational view on a larger scale with parts broken away to show the operating mechanism.

The present application is a division of my copending application Serial No. 540,672, filed June 16, 1944, now Patent No. 2,565,199, issued August 21, 1951.

In an ironing machine of the character having a pair of relatively movable ironing elements, a power driven mechanism driven by an electric motor may be employed to effect the movement of one element toward and from the other. In the case of a machine in which at least one of the elements is a roll, the power driven mechanism is also usually employed to drive such roll.

The invention herein disclosed relates to the means by which the power driven mechanism is utilized to effect the movement of the one element toward and from the other, as well as the manually operable control of such means. Such means in the present instance is in the form of a clutch of novel construction and readily operated by the manual control.

In the drawings, the invention is shown as embodied in a machine of the portable type, although the invention is not, of course, limited to this particular type. The machine comprises a base 20, at one end of which is a vertically extending head 21. Supported from the head 21 is a roll 22 constituting one of the cooperating ironing elements. The roll 22 is positioned with its axis horizontal and extending parallel to the front of the base 20. The other ironing element in the present instance is a shoe 23 mounted at the rear of the roll 22.

The two ironing elements, namely, the roll 22 and the shoe 23, are relatively shiftable toward and from each other to permit the insertion therebetween of an article to be ironed and to permit the withdrawal of such an article. To effect such movement, the shoe in the present instance is shiftable, and for such purposes the shoe is provided on its rear side with a pair of rearwardly extending ears 24 pivotally connected by a pin 25 (see Fig. 1) to an upstanding arm 26 extending from the base at a point substantially midway between the ends of the roll 22. The arm 26 is pivotally supported to swing the shoe 23 toward and from the roll, and for this purpose is rotatably mounted on a rock shaft 27 located within the base 20 and extending from the arm 26 toward the head 21.

To effect the shifting movement of the shoe, the shaft 27 has rigidly secured thereto a lever 30 which, in the present instance, extends upwardly and is encased by the arm 26. The lever 30 is substantially shorter than the arm 26 and pivotally supports at its upper end a toggle device comprising toggle members 31 and 32, the latter slidably extending through the pin 25 on which the shoe is supported. The toggle member 32 is in the form of a screw having a nut 33 threaded thereon and a spring 34 bearing against the nut at its lower end and against the pin 25 at its upper end. The toggle members 31 and 32 are normally held in an extended position so that swinging movement of the shaft 27 and lever 30 causes the arm 26 to shift the shoe toward the roll 22. The toggle members 31 and 32 constitute a means for releasing the shoe from the roll in case of emergency, and to this end the lower toggle member 31 is provided with an upstanding hand lever 35 by which the toggle may be broken to permit the arm 26 to swing rearwardly from the roll.

The spring 34 also serves the function of resiliently forcing the shoe toward the roll when the shoe and roll are in cooperating relation. Such resilient means permits the shoe to be forced away from the roll varying distances to accommodate articles of different thicknesses as they are being ironed. Thus, should an article such as a folded towel be passed through the machine, the shoe will be moved rearwardly, thereby compressing the spring 34 to permit the arm 26 to swing slightly rearwardly without changing the position of the lever 38.

The shaft 27 is adapted to be rocked back and forth to effect the shifting movement of the shoe, and when the shaft 27 is rocked in a direction to move the shoe away from the roll, the position of the shaft is such that the weight of the shoe and its supporting structure are at the rear side of the axis of the shaft 27 and thus hold the shoe in its position remote from the roll. To prevent the shoe from swinging downwardly about the pin 25 when moved away from the roll, an abutment or seat 36 is provided on the arm 26 against which the shoe may rest when not in use. The shaft 27 is adapted to be rocked to effect the movement of the shoe by means of a curved lever 37 rigidly secured to the end of the shaft 27 adjacent the head 21. The lever 37 is shaped to extend forwardly within the base 20 and thence upwardly into the head 21. Within the head 21, the free end of the lever 37 is connected to mechanism by which the shoe may be shifted by the power drive of the machine.

The roll 22 is of the usual padded and cloth covered type, and in this instance is positioned so that it telescopes for a short distance over a portion of the head 21, as shown in Fig. 2. While the roll may have any desired construction, in the present instance it comprises a cylindrical sheet metal tube 40 rigidly mounted on a plurality of sheet metal dished members 41, one of which is shown in Fig. 2. The dished members are preferably positioned inwardly from the ends of the roll and are carried on and rigidly secured to a roll shaft 42. The roll shaft 42 extends from and is journaled in an extended portion 43 of a gear casing 44 supported by the head 21. The gear casing 44 is thus concealed from view by being located within the roll 22.

The gear casing 44 is provided with a cover portion 45, and a motor 46, by which the machine is driven, is mounted in the cover 45. The gear casing and cover are so positioned that a portion of the cover 45 extends into the upper part of the head 21 to locate the motor 46 therein. The motor 46 carries a fan 47 located within the head 21 and adapted to draw air into the head through louvers 50 formed in the head casting. The fan thus forces the air around the motor and the gear casing and outwardly through the roll 22. To simplify the construction and assembly of the gear casing 44, its cover 45, and the head 21, the gear casing and its cover are secured together by bolts 51 which likewise secure the assembled casing and cover to the head 21.

Since the motor 46 operates at a relatively high speed and it is desired to have the roll 22 operate at a much slower speed, reduction gearing is provided between the motor and the roll shaft 42. It is likewise desirable to stop the rotation of the roll whenever the shoe is moved out of cooperative relation therewith. For this purpose, a clutch is provided in the gearing.

In the present instance, the gearing for driving the roll comprises a pinion 52 (see Figs. 1 and 3) mounted on the motor shaft and meshing with a gear 53 carried on a drive shaft 54. The drive shaft 54 is journaled at its right-hand end in the gear casing cover 45 and at its left-hand end in the gear casing 44. The drive shaft 54 carries a pinion 55 adjacent its left end, meshing with a constantly rotating gear 56 rotatably mounted on a stub shaft 57. The stub shaft 57 is likewise journaled at one end in the gear casing cover 45 and at its other end in the gear casing 44, and carries a clutch, indicated generally at 60, for connecting the gear 56 in driving relation with the stub shaft 57. The stub shaft 57 has rigidly secured thereto a pinion 61 meshing with a gear 62 carried on the right-hand end of the roll shaft 42 within the gear casing 44.

The clutch 60, in the present instance, comprises a shiftable member 63 (see Fig. 5) slidably mounted on the stub shaft 57 but secured for rotation therewith as by a key 64. The member 63 is provided with a flange 65 having a plurality of annularly arranged apertures 66 adapted to receive pins 67 rigidly mounted in and extending from the adjacent face of the constantly rotating gear 56. The projecting ends of the pins 67 are rounded so that they will cam themselves into the apertures 66, should they be out of alignment therewith when the flange 65 is moved toward the gear 56.

The shiftable clutch member 63 is adapted to be moved toward the gear 56 to effect engagement with the pins 67 by means of a coil spring 70 surrounding the stub shaft 57 and abutting against a washer 71 held against endwise movement by a transverse pin 72. To effect disengagement of the clutch, the clutch member 63 is provided with a second flange 73 engageable by one arm of a bell crank 74. The bell crank 74 is adapted to be manually operated to disengage the clutch at certain times in the operation of the machine and also is adapted to be engaged by a portion of the shoe shifting mechanism, as will be more fully described hereinafter, to hold the clutch in its disengaged position when the shoe is moved away from the roll.

The bell crank 74 comprises a somewhat elongated web portion 75 (see Figs. 1, 2 and 5) bent at an angle to form the two arms of the bell crank and having at its two ends flange portions 76 which are pivotally supported by a bracket 77 secured to the interior of the gear casing 44.

As heretofore mentioned, the shoe 23 is adapted to be shifted by power supplied by the motor 46. Such mechanism is controlled by the operator and is adapted to shift the shoe in one direction or the other under the control of the operator, and to disengage the power drive from the mechanism automatically at the conclusion of the shifting movement.

In the present instance, the power for effecting the shifting movement is received from the drive shaft 54. Mounted on the shaft 54 adjacent its right end is a pinion 80 constantly driving a gear 81 (see Figs. 1, 2 and 3). The gear 81 is rotatably mounted on a shaft 82, and rigidly secured to the gear 81 is a peripherally notched driving member 83. The notched driving member 83 thus is constantly driven.

Rigidly secured on the shaft 82 is a driven member 84 in the form of a disk provided with a hub 85. The disk portion of the driven member 84 is closely adjacent the driving member 83 and is adapted to be connected therewith to effect engagement of the power drive for shifting the shoe. Such driving engagement is effected through a finger device 86 carried by the driven member 84. When the driving and driven members 83 and 84 are in driving engagement, the shaft 82 is thereby rotated. The shaft 82 also carries a pinion 87 meshing with a gear 90 mounted on a cam supporting shaft 91. Mounted for rotation with the gear 90 is a cam 92 which, in the present instance, is of a form comprising a plurality of lobes 93 adapted to successively engage a cam follower or lever 94.

The cam follower or lever 94 has a rounded end portion 95 (see Fig. 1) adapted to bear against the periphery of the cam 92 so that the lever 94 will be actuated by rotation of the cam. The lever 94 is pivotally supported intermediate its ends on a tubular member 96 mounted in the gear casing cover 45. The lever 94 extends downwardly and at its lower end carries a pin 97 for connecting the end of the lever 94 with the adjacent end of an intermediate lever 100. The lever 100 is mounted on and is secured to a rock shaft 101 journaled in the gear casing cover and extending therethrough. Secured to the outer end of the rock shaft 101 is a second intermediate lever 102 pivotally connected by spaced links 103 to the free end of the shoe actuating lever 37.

By an inspection of Fig. 1, it will be noted that when the rounded end portion 95 of the lever 94 is in engagement with the high point of one of the lobes 93 of the cam 92, the arrangement of levers is such that the free end of the shoe actuating lever 37 is moved downwardly to move the shoe into operative relation with the roll, as shown in that figure. Further rotation of the cam will permit the rounded end portion 95 of the lever 94 to move inwardly toward the cam axis and thereby raise the free end of the lever 37 to permit the shoe to fall away from the roll. In the present instance the weight of the shoe and its support are such that they tend to move away from the roll and thus hold the rounded portion 95 of the lever 94 in engagement with the cam 92.

Since the cam lever 94 and the first intermediate lever 100 are mounted on fixed pivots, the pin 97 which connects these two levers must be permitted to shift relative to one of them to provide for the swinging movement of both of these levers about different axes. To this end, the pin 97 is fixed in one of the levers and operates in a slot in the other of these two levers. In the present instance the pin 97 is fixed to the lower end of the cam lever 94 and the slot, indicated at 104, is provided in the end of the intermediate lever 100.

As heretofore mentioned, each lobe 93 of the cam 92 is adapted to effect a movement of the shoe toward the roll when the cam is moved through an angle equal to one half the angularity of each lobe, and similarly is adapted to move the shoe away from the roll by an equal movement of the cam. Each lobe thus has a rising portion and a receding portion to effect such movement, the cam rotating in the direction indicated by the arrow in Fig. 1. The drive for the cam therefore must be stopped both at each low point as well as each high point, the low points being the position of contact with the rounded end 95 when the shoe is away from the roll and the high points being the point of contact with the rounded end 95 when the shoe is in operative relation with the roll.

The clutch for controlling the rotation of the cam 92, as mentioned above, comprises in the present instance the device 86 in the form of a finger cooperating with the notched driving member 83. The finger 86 is pivotally supported by a pin 105 (see Fig. 4) extending from one face of the driven member 84, and is curved to extend about the driving member 83. Intermediate its ends the finger 86 is provided with a tooth 106, and the finger 86 is adapted to swing about the pin 105 to move the tooth 106 into engagement with one of the notches in the driving member 83 to thereby effect engagement of the clutch. Disengagement of the clutch, obviously, is effected by swinging the finger 86 outwardly to move the tooth 106 beyond the periphery of the driving member 83. Normally the finger 86 is urged in a direction to cause engagement with the tooth 106 and the driving member 83 by a spring. Such spring, indicated here at 107, is of the torsion type and surrounds the pin 105, the spring being located between the adjacent faces of the finger 86 and the driven member 84. The spring 107 is provided with tangentially extending arms 110 and 111, the arm 110 having its end hooked to engage in an aperture 112 in the driven member 84, and the arm 111 having its end hooked to engage in an aperture 113 in the end of the finger 86. The spring is so wound that through its arms 110 and 111 it exerts a force tending to pivot the finger 86 about the pin 105 to cause the tooth 106 to engage the driving member 83. When the tooth 106 is so engaged with the driving member, the driven member 84 will thus rotate with the driving member 83.

The finger at its other or free end, indicated at 114, extends beyond the periphery of the driven member 84 for engagement with a disengaging member, indicated generally at 115, movable into and out of the path of the end 114 of the finger 86. When the disengaging member 115 lies in the path of the end 114, engagement of the end 114 therewith causes the finger 86 to swing about the pin 105 and thus move the tooth 106 out of engagement with the driving member 83. When the disengaging member 115 is shifted out of the path of the end 114, the spring 107 causes the tooth 106 to move into engagement with the driving member 83.

The finger 86, in the present instance, provides a positive stop for the driven member 84 when the tooth 106 is disengaged from the driving member 83. Thus it will be noted that the end 114 of the finger 86 swings outwardly when being disengaged by the member 115, such outward swinging movement brings the end 114 more fully into engagement with the disengaging member 115 so that rotation of the finger 86 and the driven member 84 will thereby be positively stopped by the disengaging member 115. Such positive stop prevents over-running of the clutch, and the shoe consequently will definitely be stopped in its shifting movement either in its roll engaging position or when moved away from the roll.

It will be noted that each notch in the driving member 83 has a straight rear side 116 so that the tooth 106 will have positive engagement with the driving member during driving and cannot be forced out of such driving engagement. The forward side of the notch, however, is flared outwardly, as at 117, away from the tooth to permit the tooth to move freely out of the notch when the finger 86 is swung about its pivot pin 105.

Because of the positive stopping of the driven member 84 by the disengaging member 115, such stoppage is apt to occur the moment that the tooth 106 barely clears the periphery of the driving member 83. Rotation of the driving member 83 relative to the tooth 106 is therefore apt to cause a clicking noise between the two unless the tooth 106 is moved a substantial distance from the driving member 83. The present structure is arranged to prevent such clicking noise by moving the finger 86 so that the tooth 106 is entirely clear of the driving member. To this end, the finger 86 is provided with an elongated slot 120 in which the pivot pin 105 is received, and the torsion spring 107 is formed in a loop of substantially larger diameter than the pin 105. When the tooth 106 is in engagement with the driving member 83, as shown in Fig. 4, the torsion spring 107 first causes the finger to pivot counterclockwise about the pin 105. When the tooth 106 is fully engaged in the driving member 83, the pull of the driving member 83 tends to shift the finger 86 on the pivot pin 105 so that the latter will be positioned in the outer end of the slot 120, as shown in Fig. 4.

When the disengaging member 115 swings the finger 86 to disengage the tooth 106 from the driving member, the movement of the finger 86 is first a pivotal movement about the pin 105. However, as soon as the tooth 106 is disengaged from the driving member, the torsion spring tends to swing the finger 86 about its end 114, and the finger will thus be shifted so that the pin 105 is at the inner end of the slot 120, the elongation of the slot being transverse to a line extending from the slot to the end 114. Such shifting movement of the finger about the end 114 moves the tooth 106 entirely clear of the driving member 83 so that the former cannot click against the latter during relative rotation.

The disengaging member 115 is supported at its outer end for shifting movement by a rock shaft 121 extending through the tubular member 96, the rock shaft 121 being rotatable relative to the disengaging member 115 for purposes hereinafter described. The disengaging member 115 is also supported adjacent its finger engaging end on an extension 122 of the cam supporting shaft 91. The disengaging member is adapted to be shifted in a direction parallel to the axis of the driving member 83 and driven member 84 to move in and out of the path of the finger 86. Normally the disengaging member 115 is urged into such path by a compression spring 123 mounted on the extension 122 and is adapted to be momentarily shifted out of such path by control means, hereinafter described.

It will be ovbious that, when the shoe is moved away from the roll, the compression of the spring 34 tends to cause an over drive of the shoe shifting mechanism, and when the shoe is moved toward the roll, the spring 34 places a load on the motor in addition to that incurred merely by shifting the shoe, since the spring 34 is compressed by the latter movement. The present machine is provided with means for effecting a braking action during the time when the spring 34 tends to assist the motor, and to store the energy expended in such braking action for return to the driving mechanism at the time when the load on the motor is greatest, that is, when the shoe is being moved toward the roll and the spring 34 is being placed under compression. To accomplish this purpose, I provide an energy storing device acting in the present instance on the cam 92 and functioning to store energy during the time when a receding portion of the cam is in cooperative relation with the cam lever 94. The energy storing device is also operable to return such energy to the mechanism by tending to drive the cam forwardly when a rising portion of the cam is in operative relation with the lever 94. As shown in Figs. 3 and 4, such energy storing device comprises a spring pressed member in the form of a plunger 124 slidably mounted in a socket 125 formed in the cover 45 of the gear casing. The plunger 124 is movable in a direction parallel to the axis of the cam 92 and is provided with a conical head 126 adapted to bear on the periphery of the cam. Within the socket 125 and back of the plunger 124 is a compression spring 127 tending to force the plunger outwardly and to hold the conical head 126 in engagement with the cam. The plunger 124 is positioned so that it will engage a rising surface on one of the lobes of the cam when the lever 94 is in engagement with a receding surface, and will engage a receding surface of the cam when the lever 94 is in engagement with a rising surface.

As the cam rotates in a clockwise direction, as shown in Fig. 1, the rising surface of one of the lobes of the cam will cause the plunger 124 to move inwardly of the socket 125 and thus progressively comprises the spring 127. During this period of time, the lever 94 engages a receding portion of the cam to permit the shoe 23 to move away from the roll. Since the spring 34 is at this time tending to assist the motor, the compression of the spring 127 will absorb energy and thus provide the desired braking action.

When the shoe is next shifted toward the roll, the lever 94 is in contact with a rising portion of one of the lobes of the cam, and in the final part of the movement the motor also functions to compress the spring 34. During this period of time, the plunger 124 is in contact with a receding portion of one of the cam lobes, and the energy previously stored in the spring 127 tends to drive the cam forwardly through a camming action between the conical head 126 and the periphery of the cam. Thus the energy previously stored in the spring 127 when the load on the motor was relatively light is now utilized to assist the motor when the load on the motor is relatively heavy. The effect of the spring 34 on the drive mechanism is therefore counterbalanced, and the peak load on the motor is materially reduced, since when the spring 34 is tending to retard the drive mechanism, the plunger 124 is tending to advance the drive mechanism. In practical operation, it is found that a very considerably smaller motor may be used in the machine by virtue of the compensating effect of the plunger 124 and its function of reducing the peak load on the motor.

The shifting of the shoe is, of course, under the control of the operator, and the rotation of the roll is controlled as an incident to the shifting movement of the shoe. As heretofore described, the roll clutch 60, when the roll is operating, is adapted to be shifted out of engagement by the bell crank 74. To effect such shifting movement manually, the rock shaft 121, which extends through the tubular member 96, carries adjacent its outer end an operating arm 130 (see Figs. 1, 3, 4 and 5). The operating arm 130 is provided with two angularly spaced actuating portions or fingers, one of which, indicated at 131, is adapted to engage the adjacent arm of the bell crank 74 to so swing the bell crank as to force the clutch 60 out of engagement with the gear 56. The rock shaft 121 extends through the tubular member 96 and to a point outside of the gear casing cover 45 but within the head 21. The outer end of the rock shaft 121 is connected to manually operable means, hereinafter described, which is so constructed that the rock shaft and operating arm 130 may be rocked manually in a clockwise direction, as viewed in Figs. 1 and 4. To return the arm 130 to its original position, a torsion spring 129 (see Fig. 2) is mounted on the shaft 121 with one end secured to the shaft and the other end bearing against the adjacent portion of gear casing cover 45.

The actuating finger 131 of the arm 130 is so positioned that it engages the bell crank 74 immediately upon the start of the rocking movement of the shaft 121. The roll clutch 60 is thereby disengaged during the first part of the movement of the operating arm 130.

Further rocking movement of the shaft 121 thereafter causes actuation of the shoe shifting mechanism. For this purpose the operating arm 130 is provided with a second actuating finger 132 movable parallel to the face of the disengaging member 115 and engageable with a cam surface 133 formed on the disengaging member 115 intermediate its ends. The disengaging member 115, in its preferred form, comprises a strip of metal bent so that it may extend parallel and closely adjacent to the operating arm 130, and the cam surface 133 is provided merely by forming a bulge in the strip of metal. The second operating finger 132 is so positioned relative to the first operating finger 131 that the finger 132 engages the cam surface 133 after the roll clutch has been shifted. The disengaging member 115 will thereby be shifted laterally out of the path of the clutch finger 86 of the shoe shifting mechanism to permit engagement thereof with the driving member 83 for effecting the shifting movement of the shoe away from the roll.

When the shoe is positioned away from the roll, means is provided for holding the roll clutch 60 disengaged so that the operating arm will not have to be manually held in a position to stop the drive of the roll. To this end, the pivot pin 97 which connects the levers 94 and 100 is provided with an extension 134 projecting into the path of movement of the bell crank 74. When the shoe is away from the roll, the extension 134 engages the bell crank 74 so that the latter holds the roll clutch disengaged. The operating arm 130 may therefore be released to be returned to its original position by the torsion spring 129, and the roll clutch will continue to be held disengaged.

Since the operating arm 130 is permitted to return to its original position immediately after being rocked to move the disengaging member 115 out of the path of the finger 86, the disengaging member is shifted back into the path of the finger 86 by the spring 123. Such movement of the disengaging member occurs during the time when the finger 86 and the driven member 84 are making one revolution, or, in other words, when the cam 92 is moving through one eighth of a revolution. The disengaging member 115 will thereupon effect disengagement of the finger 86 from the driving member, and the shoe will remain in its position away from the roll.

To move the shoe toward the roll, the rock shaft 121 is again manually operated to rock the operating arm 130. The first actuating finger 131 does not, in this instance, affect the roll clutch 60, since the latter is held disengaged by the extension 134. However, the second actuating finger 132 of the operating arm 130 again forces the disengaging member 115 out of the path of the finger 86 to permit the latter to engage the driving member 83. Such engagement thereupon causes actuation of the cam 92 to move the shoe toward the roll. As the shoe moves toward the roll, the extension 134 is shifted by movement of the levers 94 and 100, and the bell crank 74 permits the spring 70 of the roll clutch to cause engagement of such clutch and start the roll.

In present-day ironing machines, it is of course desirable to be able to stop the rotation of the roll when the shoe is in operative relation therewith in order to utilize the machine for pressing. The present manual control provides for such method of operation of the machine without necessitating a separate control lever therefor. Thus, assume that the roll is rotating and the shoe is in operative relation thereto and it is desired to stop the roll to press the article being ironed. By rocking the rock shaft 121 through the first part of its movement, the roll clutch 60 may be disengaged as described above. However, the operating arm 130 need not be moved through its full range so that the shoe control clutch will not be actuated. Thus the shoe will remain in operative relation to the roll but the roll will be stopped. Such stoppage of the roll may be continued so long as the rock shaft 121 is held in its partially rocked position. Release of the rock shaft 121 so that it may be returned to its original position by the torsion spring 129 again starts the rotation of the roll since the roll clutch 60 will again become engaged. However, if it is desired to shift the shoe away from the roll at the conclusion of the pressing, the rock shaft 121 may then be operated to the full extent of its movement for withdrawing the shoe from the roll.

If it is desired to shift the shoe toward the roll and immediately utilize the machine for pressing without ever starting the roll, the rock shaft 121 is first moved through its full range of movement to effect shifting of the shoe. However, instead of completely releasing the rock shaft so that it would move back to its original position, it is permitted to turn only part way toward the original position, far enough so that the second actuating finger 132 is clear of the cam surface 133 but the first actuating finger 131 is not shifted far enough to permit engagement of the clutch 60. Thus the shoe will be shifted toward the roll but the roll clutch will be held out of engagement.

The rock shaft 121 at its outer end but within the head 21 is bent to provide a rearwardly extending arm 135 (see Figs. 2 and 3). Connected to the outer end of the arm 135 is a link 136 extending downwardly within the head 21. The lower end of the link 136 is adapted to be connected to a manually operable member provided with means extending externally of the machine, comprising a hand lever which may be placed in a number of different positions to suit the convenience of the operator.

In operation, the operator actuates the hand lever to rock the shaft 121 in the desired direction. Movement of the rock shaft 121 causes rocking movement of the operating arm 130 within the gear casing. Since the roll clutch 60 is held in disengaged position by the extension 134 of the pin 97 at this time, the roll clutch will be unaffected by movement of the operating arm 130. However, movement of the operating arm through its entire range causes the actuating finger 132 to cam the disengaging member 115 out of engagement with the end 114 of the clutch finger 86. The torsion spring 107 will then swing the finger 86 about the pin 105 and cause the tooth 103 to enter the notch in the driving member 83. Full driving engagement by the straight rear side 116 of the notch in the driving member will thereupon cause rotation of the driven member 84. During the first part of such driving movement, the finger 86 will be shifted on the pin 105 so that the latter is located in the outer end of the slot 120 in the finger, as shown in Fig. 4.

Rotation of the driven member 84 effects rotation of the shaft 82 and the pinion 87 to drive the gear 90 and the shaft 91 carrying the cam 92. Such movement of the cam causes the rounded end 95 of the lever 94 to be swung outwardly, as viewed in Fig. 1, by the rising portion of the lobe, and the lever 94 will thereby be swung in a counterclockwise direction. Movement of the lever 94 through its connection by the pin 97 with the shaft 100 will cause the latter, together with the rock shaft 101 and the second intermediate lever 102, to swing in a clockwise direction. Such movement obviously through the links 103, lever 37, rock shaft 27 and lever arm 26 will cause the shoe to be moved toward the roll.

When the finger 86 is so disengaged, the driven member 84 will stop. The finger 86, however, is shifted entirely clear of the driving member 83 so that no clicking noise will occur, since the torsion spring 107 will cause the finger 86 to pivot about its end 114 to the extent permitted by the elongation of the slot 120. In other words, the finger will swing so that the pin 105 occupies the inner end of the slot 120 and the tooth 106 will be spaced a substantial distance from the driving member 83 so that the teeth of the latter cannot click against the tooth 106 during relative rotation.

After the article has been ironed and it is desired to stop the machine, the operator again actuates the hand lever. Such movement causes the actuating finger 131 to shift the roll clutch 60 out of engagement and also moves the second actuating finger 132 against the cam surface 133 to shift the disengaging member 115 out of engagement with the end 114 of the finger 86. The driven member 84 will thereupon be rotated through one revolution to cause the cam to move through one eighth of a revolution. During such movement, the rounded end 95 of the lever 94 is in engagement with a receding portion of the cam, and the pressure of the spring 34 as well as the weight of the shoe and its supporting arm 26 tend to swing the shoe away from the roll.

The hand lever when actuated for causing movement of the shoe away from the roll is immediately released to swing back to its original position so that the clutch disengaging member will thereupon be moved into the path of the end 114 of the finger 86 to disengage the latter after one revolution. As the levers 94 and 100 swing to move the shoe away from the roll, the extension 134 on the pin 97 is moved into position to hold the bell crank for retaining the clutch 60 in its disengaged position. Thus when the machine is idle with the shoe moved out of operative relation with the roll, the roll is held stationary.

I claim:

1. In an ironing machine, a notched driving member, a coaxial driven member, a finger having a pivotal connection at one end with the driven member, a tooth on said finger intermediate its ends for engaging said driving member, a disengaging member shiftable into the path of the other end of said finger, said pivotal connection comprising a pin and an elongated slot providing for shifting movement of the disengaging member relative to the driven member to permit the finger to pivot about said disengaging member when said tooth is disengaged, and a spring normally tending to swing said finger about said pivotal connection to effect engagement of the tooth and driving member and tending to swing said finger about said disengaging member to move said tooth clear of said driving member when disengaged therefrom.

2. In an ironing machine, a notched driving member, a coaxial driven member, a finger having a pin and slot connection at one end for pivoting the finger on said driven member, a tooth intermediate the ends of said finger for engaging said driving member, a disengaging member shiftable into the path of the other end of said finger to swing said finger about said pin and thereby disengage said tooth from said driving member, said slot being elongated to permit said finger to swing about said disengaging member, and a spring operable to swing said finger about said pin to effect engagement of said tooth with said driving member when the disengaging member is moved out of the path of said finger and tending to swing said finger about said disengaging member when engaged thereby to the extent permitted by engagement of said pin with one end of said slot, said finger being shifted by driving engagement with the driving member to an extent permitted by engagement of said pin with the other end of said slot.

3. In an ironing machine, a driving member, a coaxial driven member, a finger device pivoted on said driven member and shiftable into and out of engagement with said driving member, a disengaging member comprising an elongated member extending in a generally radial direction into the path of said finger device, a spring support for said elongated member supporting the latter for movement parallel to the axis of said driving and driven members and tending to hold said elongated member in said path to disengage the finger device from said driving member, and a manually operable camming member pivotally supported to swing in a plane parallel to and adjacent said elongated member and engaging an intermediate portion of said elongated member to force it in a direction parallel to said axis out of the path of said finger device.

4. In an ironing machine, a driving member, coaxial driven member, a finger pivotally mounted on one face of said driven member and swingable about its pivot into and out of engagement with said driving member, a spring operated disengaging member normally extending in coplanar relation with said finger in the path of said finger and comprising a metal strip having a bulge extending to one side thereof, and a manually operable camming member pivotally supported to swing in a plane parallel to and adjacent said disengaging member and engageable with said bulge to force said disengaging member laterally out of the path of said finger.

WILLIAM H. BRADLEY.

REFERENCES CITED

The following references are of record in the file of this patent:

UNITED STATES PATENTS

| Number | Name | Date |
| --- | --- | --- |
| 1,782,572 | Janda | Nov. 25, 1930 |
| 1,921,301 | Peter et al. | Aug. 8, 1933 |
| 1,987,742 | Lawrence | Jan. 15, 1935 |
| 2,083,505 | Ringer | June 8, 1937 |